(12) United States Patent
He et al.

(10) Patent No.: US 11,477,187 B2
(45) Date of Patent: Oct. 18, 2022

(54) API KEY ACCESS AUTHORIZATION

(71) Applicant: International Business Machines Corporation, Armonk, NY (US)

(72) Inventors: Yi Fei He, Shanghai (CN); Gang Tang, Nanjing (CN); Hua Hong Wang, Shanghai (CN); Xiaoli Xu, Shanghai (CN); Yu Chi Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 16/810,890

(22) Filed: Mar. 6, 2020

(65) Prior Publication Data

US 2021/0281555 A1 Sep. 9, 2021

(51) Int. Cl.
*G06F 3/00* (2006.01)
*H04L 9/40* (2022.01)
*G06F 9/54* (2006.01)

(52) U.S. Cl.
CPC .............. *H04L 63/083* (2013.01); *G06F 9/54* (2013.01)

(58) Field of Classification Search
CPC ..................................................... G05F 9/541
See application file for complete search history.

(56) References Cited

U.S. PATENT DOCUMENTS

| | | |
|---|---|---|
| 8,484,637 B2 | 7/2013 | Farhangi et al. |
| 8,793,359 B1 | 7/2014 | Fiebig et al. |
| 10,044,701 B2 | 8/2018 | Blasi |
| 10,305,913 B2 | 5/2019 | Yamamoto et al. |
| 10,382,203 B1* | 8/2019 | Loladia ................... H04L 63/06 |
| 2005/0138362 A1* | 6/2005 | Kelly ................. H04L 63/0807 713/156 |
| 2008/0144625 A1* | 6/2008 | Wu ........................ H04L 45/306 370/392 |
| 2010/0235882 A1 | 9/2010 | Moore |
| 2015/0134956 A1* | 5/2015 | Stachura ............. H04L 63/0807 713/168 |
| 2015/0193600 A1* | 7/2015 | Matsuda ................. G06F 21/10 726/9 |
| 2015/0261948 A1 | 9/2015 | Marra et al. |
| 2018/0013565 A1* | 1/2018 | Fox ....................... H04L 9/0643 |

(Continued)

OTHER PUBLICATIONS

Mike Bond, API-Level Attacks on Embedded Systems. (Year: 2001).*

(Continued)

*Primary Examiner* — Lechi Truong
(74) *Attorney, Agent, or Firm* — David B. Woycechowsky

(57) ABSTRACT

In an approach for an API key access authorization, a processor receives a transaction identity, a part of a token, and an API key identity attribute from a server. The transaction identity is generated in the server associated with generating the token. A processor receives a request from a client with the transaction identity for the part of the token. A processor looks up a transaction table via the transaction identity as an index. The transaction identity is associated with the part of the token and the API key identity attribute. A processor retrieves a client identity attribute through a second server via an IP address of the client. The second server registers the client. A processor matches a policy via the API key identity attribute and the client identity attribute. A processor sends the part of the token to the client.

14 Claims, 10 Drawing Sheets

(56) References Cited

U.S. PATENT DOCUMENTS

| | | |
|---|---|---|
| 2019/0068438 A1 | 2/2019 | Kumer et al. |
| 2020/0250664 A1* | 8/2020 | Kumar ............... G06Q 20/3674 |
| 2021/0281555 A1* | 9/2021 | He ........................... G06F 9/54 |
| 2022/0108305 A1* | 4/2022 | Hosp ................ G06Q 20/40975 |

OTHER PUBLICATIONS

Claudio Marforio, Smartphones as Practical and Secure Location Verification Tokens for Payments. (Year: 2014).*
Mell et al., "The NIST Definition of Cloud Computing", Recommendations of the National Institute of Standards and Technology, Special Publication 800-145, Sep. 2011, 7 pages.

* cited by examiner

| Client Type | Client Type Description | Client Identity Attribute |
|---|---|---|
| kube-pod | This is to select Kubernetes pod(s) | name, label, namespace |
| cf-app | This is to select Cloud Foundry application(s) | name, org, space |
| raw | This is to use ip-whitelist kind of style to select clients | ip_prefix |

FIG. 6

| Policy Example | Description |
|---|---|
| `{`<br>`"subject": {`<br>`  "type": "kube-pod",`<br>`  "label": "app=foo-ui-frontend"`<br>`},`<br>`"target": {`<br>`  "name": "foo-ui-s3-apikey"`<br>`}`<br>`}` | Authorize all the Kubernetes pods whose name contains "foo-ui-" prefix to use the API key that has the name "foo-ui-s3-apikey" |
| `{`<br>`"subject": {`<br>`  "type": "cf-app",`<br>`  "org": "vpc@xyz.com",`<br>`  "space": "prod"`<br>`},`<br>`"target": {`<br>`  "name": "foo-ui-s3-apikey"`<br>`}`<br>`}` | Authorize all Cloud Foundry applications in "prod" space, foo@xyz.com organization to use the API key that has the name "foo-ui-s3-apikey" |
| `{`<br>`"subject": {`<br>`  "type": "raw",`<br>`  "ip-prefix": "192.168.1.0/24"`<br>`},`<br>`"target": {`<br>`  "name": "foo-ui-s3-apikey"`<br>`}`<br>`}` | Authorize client(s) in subnet 192.168.1.0/24 to use the API key that has the name "foo-ui-s3-apikey" |

FIG. 7

API KEY ACCESS AUTHORIZATION

BACKGROUND

The present disclosure relates generally to the field of authorization, and more particularly to application programming interface (API) key access authorization.

An API key is a unique identifier used to authenticate a user, developer, or calling program to an API. An API key may generally be used to authenticate a project with the API rather than a human user. Different platforms may implement and use API keys in different ways. An API key or application programming interface key is a code that gets passed in by computer applications. The program or application then calls the API or application programming interface to identify its user, developer or calling program to a website. The API key often acts as both a unique identifier and a secret token for authentication. The API key may generally have a set of access rights on the API associated with it. An API may allow two systems to communicate with one another. An API may provide the language and contract for how two systems interact. Each API may have documentation and specifications which determine how information can be transferred.

SUMMARY

Aspects of an embodiment of the present disclosure disclose an approach for an API key access authorization. A processor receives a transaction identity, a part of a token, and an API key identity attribute from a server. The transaction identity is generated in the server associated with generating the token. A processor receives a request from a client with the transaction identity for the part of the token. A processor looks up a transaction table via the transaction identity as an index. The transaction identity is associated with the part of the token and the API key identity attribute. A processor retrieves a client identity attribute through a second server via an IP address of the client. The second server registers the client. A processor matches a policy via the API key identity attribute and the client identity attribute. A processor sends the part of the token to the client.

BRIEF DESCRIPTION OF THE DRAWINGS

FIG. 6 is an example client identity attribute table illustrating a client type, a client type description, and a client identity attribute, in accordance with an embodiment of the present disclosure.

FIG. 7 is an example policy table illustrating a policy module of the local authorization server of FIG. 1, in accordance with an embodiment of the present disclosure.

DETAILED DESCRIPTION

Figure 1:
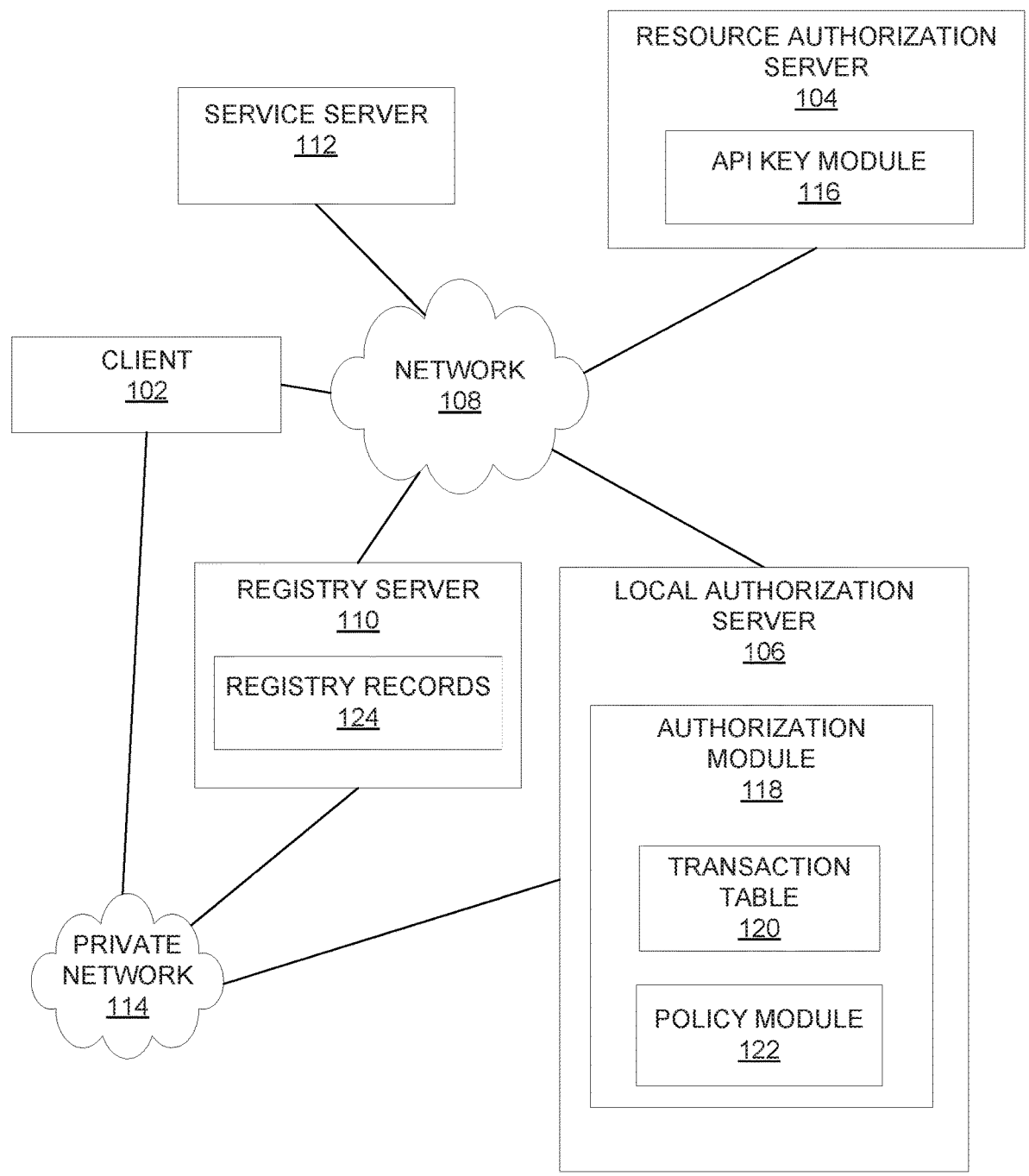
FIG. 1 is a functional block diagram illustrating an API key access authorization environment, in accordance with an embodiment of the present disclosure.

The present disclosure is directed to systems and methods for API key access authorization.

A client may consume an external backing service over a network as an attached resource. For example, a backing service can be a public service provided by a service provider. A client may be a piece of computer hardware or software that accesses a service made available by a server. A client may be a computer or a program that, as part of its operation, relies on sending a request to another program or computer hardware or software that accesses a service made available by a server (which may or may not be located on another computer). For example, web browsers are clients that connect to web servers and retrieve web pages for display. Email clients retrieve email from mail servers. Online chat uses a variety of clients, which vary on the chat protocol being used. Multiplayer video games or online video games may run as a client on each computer. The term "client" may also be applied to computers or devices that run the client software or users that use the client software.

To access a public service, a client, may be configured with an API key and may use the API key to exchange for an access token to access the service. An API key may be a unique identifier used to authenticate a user, developer, or calling program to an API. In some examples, an API key may be used to authenticate a project with the API rather than a human user. Different platforms may implement and use API keys in different ways. An API key may be a code that gets input by computer applications. The API key may act as both a unique identifier and a secret token for authentication and may generally have a set of access rights on the API associated with it. An API may allow two systems to communicate with one another. An API may provide the language and contract for how two systems interact. Each API may have documentation and specifications which determine how information can be transferred.

One or more embodiments of the present disclosure recognize API keys may generally not be considered secure. API keys may be accessible to clients, making it easy for someone to steal an API key. Once an API key is stolen, the API key may have no expiration and may be used indefinitely, unless the project owner revokes or regenerates the key. If an API key is meant to be accessible to the client, the API key may be considered secure if used together with other security mechanisms. One or more embodiments of the present disclosure recognize that whitelisting is the practice of explicitly allowing some identified entities access to a particular privilege, service, mobility, access or recognition. Whitelisting is the reverse of blacklisting. Another use for whitelists is local area network security. Many network admins set up MAC address whitelists, or a MAC address filter, to control who is allowed on their networks.

Whitelisting is used when encryption is not a practical solution or in tandem with encryption. However, whitelisting is sometimes ineffective because a MAC address can be faked.

One or more embodiments of the present disclosure recognize that a loss of API key information may be risky to an organization who authorizes an access to a service through the lost API key. For example, the API key may be misplaced or misused when someone leaves a project or a company, the API key is made public accessible (e.g., by an accident), and/or the API key information is captured in a log message posted to a public access web site.

One or more embodiments of the present disclosure recognize a need to protect and secure a use of an API key. One or more embodiments of the present disclosure recognize a need to reduce a risk and secure the use of the API key in the following example situation. For example, a user can get an authorization to a resource authorization server directly by an API key. A client may try to get a token from the resource authorization server using an API key. The resource authorization server gives the token to the client. The client starts to communicate with and use a provided service using the token.

One or more embodiments of the present disclosure discloses an enhancement by introducing a component called a local authorization server that can run in the same private network as the client, e.g., the application. The client may can exchange an API key for an access token after being authorized by both the resource authorization server and the local authorization server. The local authorization server may enforce a configured policy to ensure what subject can use what API keys. A policy may include a subject section and a target section. The subject section includes a client type attribute along with client identity attributes pertaining to the type that could be used to identify a client or a set of clients. In general, identity attributes may be characteristics of an identity—such as a name, location, IP address. A client may have many attributes. Client identity attributes may be attributes whose values are specific and unique to an individual, rather than attributes that multiple users might have the same value for.

The target section may include API key identity attributes that could be used to identify an API key or a set of API keys. A policy may authorize a client to use the associated API key. In order to enforce the policy for a request, the local authorization server may get the source IP address of the transmission control protocol/internet protocol (TCP/IP) connection over which the request is made. The local authorization server may use the IP address to query the application runtime instance registry. The query result may include the associated client identity attributes that the local authorization server can use for policy enforcement.

The present disclosure will now be described in detail with reference to the Figures. FIG. 1 is a functional block diagram illustrating API key access authorization environment, generally designated 100, in accordance with an embodiment of the present disclosure.

In the depicted embodiment, API key access authorization environment 100 includes client 102, resource authorization server 104, local authorization server 106, registry server 110, private network 114, service server 112, and network 108.

In various embodiments of the present disclosure, client 102 can be a computer program that accesses a service made available by a server, for example, by service server 112. Client 102 can be configured to use an API key to exchange for an access token to access the service. The API key may be from resource authorization server 104. Client 102 can communicate with and access service server 112 using the access token. Client 102 can get the access token after client 102 handshakes with resource authorization server 104 and local authorization server 106. In an example, client 102 can be an application that is configured with an API key and uses the API key to exchange for an access token to access the service. In another example, client 102 can be an application runtime instance that possess one or more unique internet protocol address(es) across private network 114. The runtime instance could be a physical server, a virtual server, an application instance, a docker container instance or a pod. A client type attribute indicates a runtime instance type and corresponds an identity attribute to be used for matching a client request with a policy. Client identity attributes may be the ones that can be used to identify a client or a set of clients. Each type of clients may use different sets of client identity attributes. For example, a cloud foundry client may use an organization name, a space name, and an application name as identity attributes to identify the cloud foundry client. A Kubernetes pod may use a name space, a pod name, and a pod label as identity attributes to identify the Kubernetes pod. In general, Kubernetes may be a portable, extensible, open-source platform for managing containerized workloads and services, that facilitates both declarative configuration and automation. A pod may be a group of one or more containers (such as docker containers), with shared storage/network, and a specification for how to run the containers.

In other embodiments, client 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, client 102 represents a computing system utilizing clustered computers and components to act as a single pool of seamless resources. In general, client 102 can be any computer program, computing device or a combination of computer programs and devices with access to resource authorization server 104, local authorization server 106, registry server 110, service server 112, private network 114, and network 108 and is capable of processing program instructions, in accordance with an embodiment of the present disclosure. Client 102 may include internal and external hardware components, as depicted and described in further detail with respect to FIG. 8.

In various embodiments of the present disclosure, resource authorization server 104 can be a computer or computer program which manages access to a centralized resource or service in a network. Resource authorization server 104 can make an authorization between client 102 and local authorization server 106. Resource authorization server 104 may be a management server, a web server, or any other electronic device or computing system capable of processing program instructions and receiving and sending data. In some embodiments, resource authorization server 104 may be a laptop computer, a tablet computer, a netbook computer, a personal computer (PC), a desktop computer, or any programmable electronic device. In other embodiments, resource authorization server 104 may represent a server computing system utilizing multiple computers as a server system, such as in a cloud computing environment. In another embodiment, resource authorization server 104 represents a computing system utilizing clustered computers and components to act as a single pool of seamless resources. Resource authorization server 104 may include internal and external hardware components, as depicted and described in further detail with respect to FIG. 8.

Further, in the depicted embodiment, resource authorization server 104 includes API key module 116. In the depicted embodiment, API key module 116 is located on resource authorization server 104. However, in other embodiments, resource authorization server 104 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between resource authorization server 104 and API key module 116, in accordance with a desired embodiment of the disclosure.

In one or more embodiments, API key module 116 is configured to generate an API key to access, for example, service server 112. When the API key is generated on resource authorization server 104, an endpoint for local authorization server 106 is configured to be associated with the API key. In an example, APIs work using 'requests' and 'responses.' When an API requests information from an application or server, the API may receive a response. The place that APIs send requests and where the resource lives, is called an endpoint. The endpoint may be a device or node that is connected to the LAN or WAN and accepts communications back and forth across the network. The endpoint may serve as a point of access to an enterprise network and create a point of entry. The endpoint may be the location from which APIs can access the resources they need to carry out their function.

The generated API key can be sent to client 102 to use. When client 102 wants to access a service from service server 112, client 102 may send the API key to resource authorization server 104 and request a token from resource authorization server 104 using the API key. When resource authorization server 104 receives the API key, API key module 116 may validate the API key. If API key module 116 determines that the API key is invalid, API key module 116 can reject the request of client 102. If API key module 116 determines that the API key is valid, API key module 116 can generate a token for accessing the service from service server 112 based on the API key. API key module 116 may generate a transaction identity associated with a timestamp to the transaction. API key module 116 can split the token into two parts. In an example, the first part can be a first segment of the token. The second part can be a second segment of the token. In another example, the two parts can be any separation of the token so long as the two parts can form the token entirely for client 102 to use as an access. API key module 116 can send the transaction identity and the first part of the token to client 102. API key module 116 can communicate local authorization server 106 based on the endpoint configured in resource authorization server 104 associated with the API key. API key module 116 can send the transaction identity, the second part of the token, and an API key identity attribute to local authorization server 106. The API key identity attribute may be an identity attribute to identify the API key. For example, an identity attribute can be a name of the API key. In another example, the identify attribute can be another attribute that can identify the API key.

In various embodiments of the present disclosure, local authorization server 106 is configured to authorize a client request to get a token segment pertaining to the transaction identity in the request from client 102. In an example, local authorization server 106 and client 102 are in the same organization internal network, for example, private network 114. In another example, local authorization server 106 and client 102 can be in a different network so long as local authorization server 106 may authorize a client request to get a token segment pertaining to the transaction identity in the request from client 102.

Local authorization server 106 may be a management server, a web server, or any other electronic device or computing system capable of processing program instructions and receiving and sending data. In some embodiments, local authorization server 106 may be a laptop computer, a tablet computer, a netbook computer, a personal computer (PC), a desktop computer, or any programmable electronic device. In other embodiments, local authorization server 106 may represent a server computing system utilizing multiple computers as a server system, such as in a cloud computing environment. In another embodiment, local authorization server 106 represents a computing system utilizing clustered computers and components to act as a single pool of seamless resources. Local authorization server 106 can be any computer program, computing device or a combination of computer programs and devices with access to network 108 and is capable of processing program instructions and executing authentication module 118. Local authorization server 106 may include internal and external hardware components, as depicted and described in further detail with respect to FIG. 8.

Further, in the depicted embodiment, local authorization server 106 includes authentication module 118. In the depicted embodiment, authentication module 118 is located on local authorization server 106. However, in other embodiments, authentication module 118 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between local authorization server 106 and authentication module 118, in accordance with a desired embodiment of the disclosure.

In one or more embodiments, authentication module 118 is configured to authorize a client request to get a token segment pertaining to a transaction identity in the request from client 102. Authentication module 118 may configure a policy to ensure what subject can use what API keys for client 102. Authentication module 118 may make a policy check for client 102. Authentication module 118 may communicate registry server 110 through local authorization server 106 in private network 114. Authentication module 118 may get client identity attribute information though an internet protocol address of client 102.

In the depicted embodiment of the present disclosure, authentication module 118 includes transaction table 120 and policy module 122. Transaction table 120 includes one or more entries for transactions when resource authorization server 104 generates tokens for client 102 using an API key to request access to a service from service server 112 or other suitable server that provides the service to be authorized based on the API key. Each entry of transaction table 120 may include a transaction identity as an index, a token segment, and API key identity attributes associated with the API key that client 102 uses to request access through resource authorization server 104. An example of transaction table 120 is further illustrated below and in FIG. 5.

In one or more embodiments, policy module 122 is configured to generate policies that may authorize client 102 to use API keys. Policies can be added to or deleted from local authorization server 106 by an administrator. In an example, a policy may include a subject section and a target section. The subject section may include a client type attribute along with other client identity attributes pertaining to that type that could be used to identify a client or a set of clients. The target section may include API key identity attributes that could be used to identify an API key or a set of API keys. A policy may authorize client 102 to use API keys. Examples of a policy are further illustrated in more detail in FIG. 7.

Policy module 122 may configure a whitelist ruleset and a blacklist ruleset through an administration. Policy module 122 may configure a policy that includes one or more fields and an API key identity attribute to match a client identity attribute and the API key. Policy module 122 may make a policy check for client 102. A client request is determined to match a policy if the client identity attributes of the request match the ones in subject section of the policy and the API key identity attributes of the matched transaction table entry match the ones in the target section of the policy.

In one or more embodiments, policy module 122 may retrieve the client identity attributes pertaining to the request from client 102. The client identity attributes may or may not necessary to be carried in the request from client 102. Policy module 122 may get a source IP address of the connection over which the request of client 102 is made. In some examples, the connection can be a TCP/IP connection. Policy module 122 may use the source IP address to query the application runtime instance registry. The query result may contain associated client identity attributes that policy module 122 can use for policy enforcement.

In one or more embodiments, policy module 122 may receive a request from client 102 to local authorization server 106 to get a token segment for a given transaction identity. Policy module 122 may look up transaction table 120 using the transaction identity. If an entry is found, policy module 122 may enforce the configured policies to decide whether client 102 is authorized to get the access token segment. Policy module 122 may examine all configured policies one by one until a policy is matched. If a policy is matched, the client is authorized to get the token segment. If none of the policies is matched, policy module 122 may reject the client request.

In various embodiments of the present disclosure, registry server 110 is configured to register client 102 within private network 114. Registry server 110 may be in a same organization internal network with local authorization server 106 and client 102 as private network 114. In the depicted embodiment, registry server 110 includes registry records 124. Records for application runtime instances can be populated in registry records 124. Registry records 124 can be populated from different sources, for example, from an existing organization IP address management system, a device inventory, or an application instance runtime management system (such as a Kubernetes API server, a cloud foundry API server) for different runtime instance type. The populated records can be synchronized with the source. Registry server 110 may be in communication with local authorization server 106 in private network 114. Registry server 110 may provide and send local authorization server 106 with the client identity attributes such as a Kubernetes cluster name, namespace, and app name or other information by an IP address of client 102.

Registry server 110 may be a management server, a web server, or any other electronic device or computing system capable of processing program instructions and receiving and sending data. In some embodiments, registry server 110 may be a laptop computer, a tablet computer, a netbook computer, a personal computer (PC), a desktop computer, or any programmable electronic device. In other embodiments, registry server 110 may represent a server computing system utilizing multiple computers as a server system, such as in a cloud computing environment. In another embodiment, registry server 110 represents a computing system utilizing clustered computers and components to act as a single pool of seamless resources. Registry server 110 can be any computer program, computing device or a combination of computer programs and devices with access to network 108 and is capable of processing program instructions. Registry server 110 may include internal and external hardware components, as depicted and described in further detail with respect to FIG. 8.

In various embodiments of the present disclosure, service server 112 is configured to provide a service for client 102. Service server 112 may be a management server, a web server, or any other electronic device or computing system capable of processing program instructions and receiving and sending data. In some embodiments, service server 112 may be a laptop computer, a tablet computer, a netbook computer, a personal computer (PC), a desktop computer, or any programmable electronic device. In other embodiments, service server 112 may represent a server computing system utilizing multiple computers as a server system, such as in a cloud computing environment. In another embodiment, service server 112 represents a computing system utilizing clustered computers and components to act as a single pool of seamless resources. Service server 112 can be any computer program, computing device or a combination of computer programs and devices with access to network 108 and is capable of processing program instructions. Service server 112 may include internal and external hardware components, as depicted and described in further detail with respect to FIG. 8.

Figure 2:
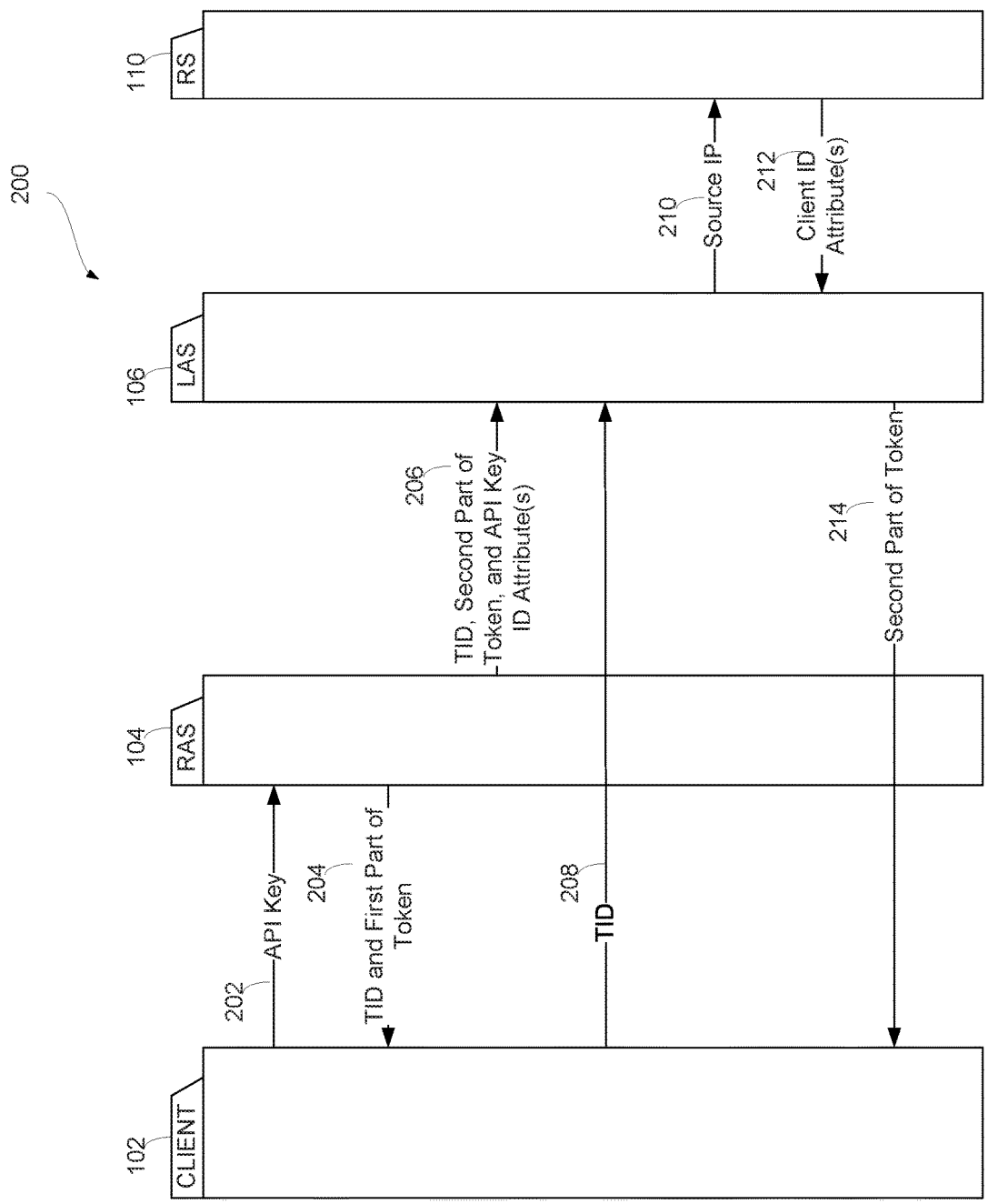
FIG. 2 is a process depicting example interactions of a client, a resource authorization server, a local authorization server, and a registry server of FIG. 1, in accordance with an embodiment of the present disclosure.

FIG. 2 is a process 200 depicting example interactions of client 102, resource authorization server 104, local authorization server 106, and registry server 110, in accordance with an embodiment of the present disclosure.

In step 202, client 102 sends an API key to resource authorization server (RAS) 104 and requests access to a service from service server 112. The API key may be originally generated on resource authorization server 104. When resource authorization server 104 receives the API key from client 102, API key module 116 validate the API key. If API key module 116 determines that the API key is invalid, resource authorization server 104 can reject the request from client 102. If resource authorization server 104 determines that the API key is valid, resource authorization server 104 can generate a token to client 102 for accessing the service from service server 112 based on the API key. Resource authorization server 104 may generate a transaction identity associated with a timestamp to the transaction. Resource authorization server 104 can split the token into two parts. In an example, the first part can be a first segment of the token. The second part can be a second segment of the token. In another example, the two parts can be any separation of the token so long as the two parts can later form the token entirely for client 102 to use as an access to service server 112.

In step 204, resource authorization server 104 sends the generated transaction identity and the first part of the token to client 102. In step 206, resource authorization server 104 sends the transaction identity, the second part of the token, and one or more API key identity attributes associated with the API key to local authorization server (LAS) 106. The one or more API key identity attributes may be an identity attribute to identify the API key. For example, the identity attribute can be a name of the API key. In another example, the identify attribute can be any attribute to identify the API key.

In step 208, client 102 sends the transaction identity received from resource authorization server 104 to local authorization server 106 to request the second part of the token generated from resource authorization server 104. When local authorization server 106 receives the transaction identity, local authorization server 106 uses the transaction identity to look up transaction table 120 in authorization module 118 of local authorization server 106. If the transaction identity is found in transaction table 120, local authorization server 106 finds the token segment and API key identity attributes associated with the transaction identity in transaction table 120.

In step 210, local authorization server 106 gets and sends to registry server (RS) 110 an IP address of the connection over which the request of client 102 is made. Local authorization server 106 may retrieve the client identity attributes pertaining to the request from client 102. The client identity attributes may or may not be necessary to be carried in the request from client 102. Local authorization server 106 may use the IP address to query the application runtime instance registry. The query result may contain the associated client identity attributes that policy module 122 can use for policy enforcement. In one or more embodiments, policy module 122 may receive a request from client 102 to local authorization server 106 to get a token segment for a given transaction identity. Policy module 122 may look up transaction table 120 using the transaction identity. If the entry based on the transaction identity is found, policy module 122 may enforce a configured policy to decide whether client 102 is authorized to get the access token segment. Policy module 122 may examine all configured policies one by one until a policy is matched. If a policy is matched, client 102 may be authorized to get the token segment. If none of the policies is matched, policy module 122 may reject the client request.

In step 212, registry server 110 sends to local authorization server 106 with the client identity attributes such as a Kubernetes cluster name, namespace, and app name or other information by the IP address of client 102. In various embodiments of the present disclosure, registry server 110 is configured to register client 102 within private network 114. Registry server 110 may be in a same organization internal network with local authorization server 106 and client 102, for example, in private network 114. In the depicted embodiment, registry server 110 includes registry records 124. Records for application runtime instances can be populated in registry records 124. Registry records 124 can be populated from different sources—existing organization IP address management system, device inventory, or application instance runtime management system (such as a Kubernetes API server, a cloud foundry API server)—for different runtime instance type. The populated records can be synchronized with the IP address within private network 114.

In step 214, local authorization server 106 sends a second part of the token generated in resource authorization server 104 to client 102. In an example, local authorization server 106 sends the second part of the token to client 102 when the client identity attributes match a policy configured in local authorization server 106. For example, local authorization server 106 may authorize and send the second part of the token to client 102 when the client identity attributes match a policy in a pre-set whitelist. Local authorization server 106 may reject client 102 when the client identity attributes are in a pre-set blacklist. In one or more embodiments, policy module 122 may receive a request from client 102 to local authorization server 106 to get a token segment for a given transaction identity. Policy module 122 may look up transaction table 120 using the transaction identity. If an entry based on the transaction identity is found, policy module 122 may enforce the configured policies to decide whether client 102 is authorized to get the access token segment. Policy module 122 may examine the configured policies one by one until a policy is matched. If a policy is matched, the client is authorized to get the token segment. If none of the policies is matched, policy module 122 may reject the client request. Once client 102 receives both the first and second parts of the token generated in resource authorization server 104, client 102 use the token to communicate and access a service in service server 112.

Figure 3:
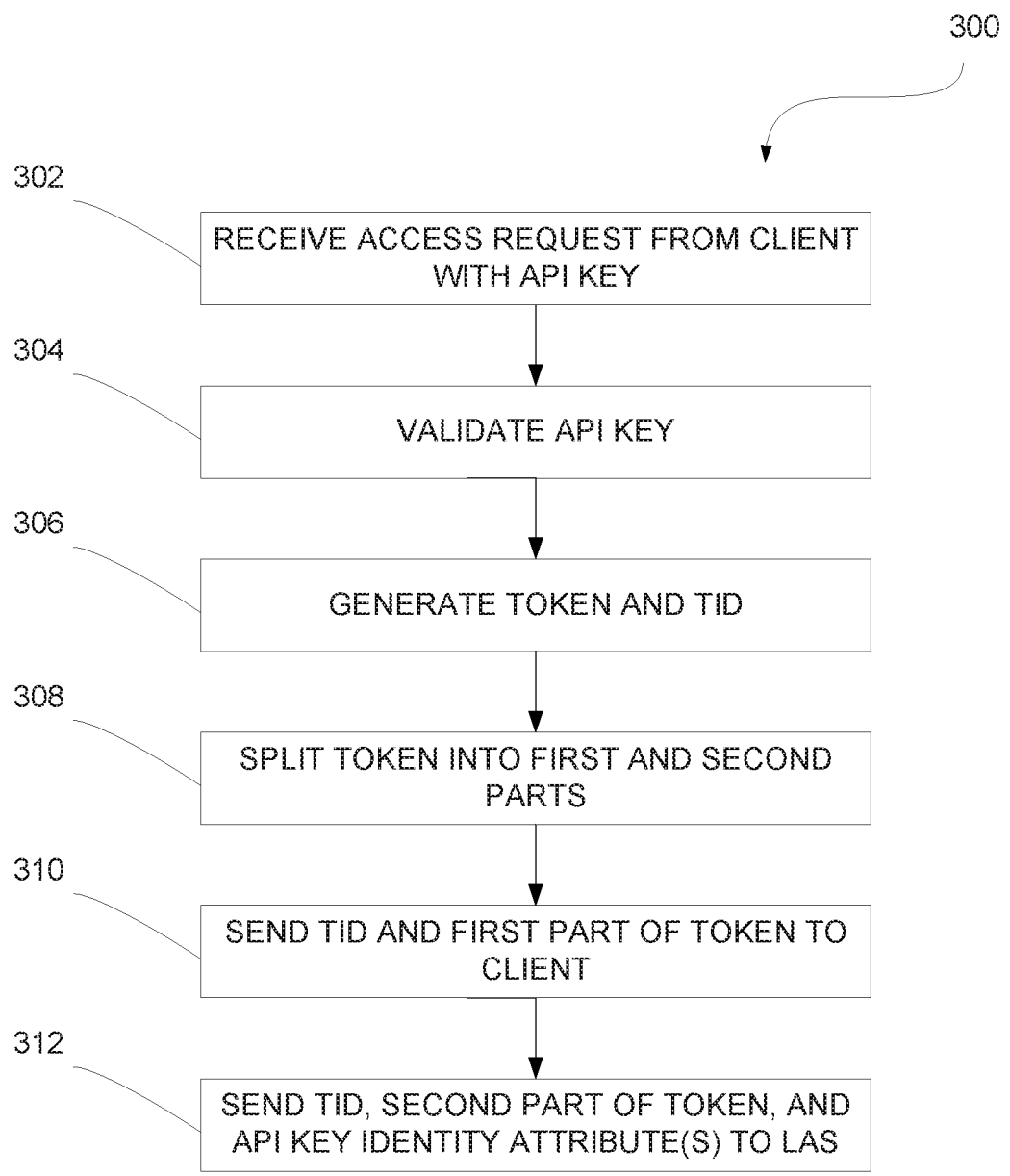
FIG. 3 is a flowchart depicting operational steps of an API key module included in the resource authorization server of FIG. 1, in accordance with an embodiment of the present disclosure.

FIG. 3 is a flowchart 300 depicting operational steps of API key module 116 in resource authorization server 104 in accordance with an embodiment of the present disclosure.

API key module 116 operates to receive a request to access a service from service server 112 from client 102 with an API key. API key module 116 also operates to validate the API key received from client 102. API key module 116 operates to generate a token for accessing the service from service server 112 based on the received API key and to generate a transaction identity associated with a timestamp to the transaction. API key module 116 sends the transaction identity and the first part of the token to client 102. API key module 116 operates to send the transaction identity and the first part of the token to client 102. API key module 116 operates to send the transaction identity, the second part of the token, and one or more API key identity attributes to local authorization server 106.

In step 302, API key module 116 receives a request to access a service from service server 112 from client 102 with an API key. In an example, the API key is generated on resource authorization server 104 to authorize access of a service from service server 112. The API key may initially be generated by API key module 116 on resource authorization server 104. The generated API key is configured to be sent to client 102 or other applications to use. In another example, when the API key is generated on resource authorization server 104, an endpoint for local authorization server 106 is configured to be associated with the API key.

In step 304, API key module 116 validates the API key received from client 102. If API key module 116 determines that the API key is invalid, API key module 116 can reject the request of client 102. If API key module 116 determines that the API key is valid, API key module 116 can generate a token for accessing the service from service server 112 based on the API key.

In step 306, API key module 116 generates a token for accessing the service from service server 112 based on the received API key. API key module 116 may generate a transaction identity (TID) associated with a timestamp to the transaction. In step 308, API key module 116 splits the token into two parts. In an example, the first part can be a first segment of the token. The second part can be a second segment of the token. In another example, the two parts can be any separation of the token so long as the two parts can form the token entirely for client 102 to use as an access to service server 112.

In step 310, API key module 116 sends the transaction identity and the first part of the token to client 102. In step 312, API key module 116 sends the transaction identity, the second part of the token, and one or more API key identity attributes to local authorization server 106. API key module 116 can locate an address of local authorization server 106. The one or more API key identity attributes can be an attribute to identify the API key. For example, the identity attribute can be a name of the API key. In another example, the identify attribute can be another attribute to identify the API key. In alternative embodiments, in step 310, API key module 116 may send the second part of the token to client 102 and may send the first part of the token to local authorization server 106.

Figure 4:
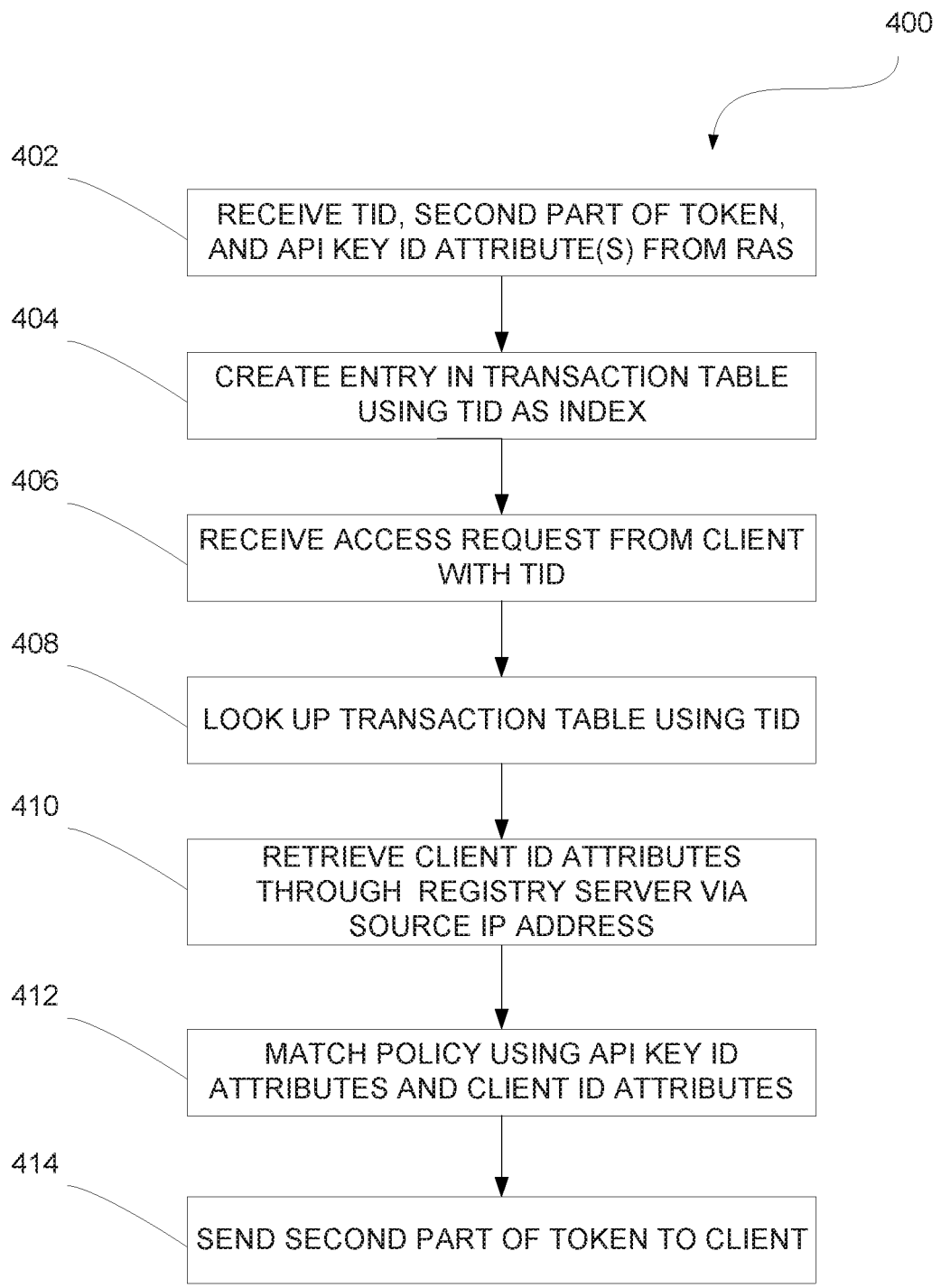
FIG. 4 is a flowchart depicting operational steps of an authorization module in the local authorization server of FIG. 1, in accordance with an embodiment of the present disclosure.

FIG. 4 is a flowchart 400 depicting operational steps of authorization module 118 in local authorization server 106 in accordance with an embodiment of the present disclosure.

Authorization module 118 operates to receive a transaction identity, a second part of a token, and one or more API key identity attributes from resource authorization server 104. Authorization module 118 also operates to create an entry in transaction table 120 using the transaction identity as an index. Authorization module 118 operates to receive a request from client 102 with the transaction identity for the second part of the token generated from resource authorization server 104. Authorization module 118 operates to look up transaction table 120 using the transaction identity as an index. Authorization module 118 operates to retrieve client identity attributes through registry server 110 via an IP address of client 102. Authorization module 118 operates to match a policy using the API key identity attributes and the client identity attributes. Authorization module 118 operates to send the second part of the token to client 102.

In step 402, authorization module 118 receives a transaction identity (TID), a second part of a token, and one or more API key identity attributes from resource authorization server 104. The transaction identity is generated in resource authorization server 104 with a timestamp to a transaction when resource authorization server 104 generates the token for accessing the service from service server 112 based on an API key. Resource authorization server 104 may split the token into two parts. In an example, the first part can be a first segment of the token. The second part can be a second segment of the token. In another example, the two parts can be any separation of the token so long as the two parts can later form the token entirely for client 102 to use as an access to service server 112. The one or more API key identity attributes may be an attribute to identify the API key. For example, the identity attribute can be a name of the API key. In another example, the identify attribute can be any attribute to identify the API key.

In step 404, authorization module 118 creates an entry in transaction table 120 using the transaction identity as an index. Transaction table 120 includes one or more entries for transactions when resource authorization server 104 generates tokens for client 102 using an API key to request access to a service from service server 112. Each entry of transaction table 120 may include a transaction identity as an index, a token segment, and API key identity attributes associated with the API key that client 102 uses to request access through resource authorization server 104. An example of transaction table 120 is further illustrated below and in FIG. 5.

In step 406, authorization module 118 receives a request from client 102 with the transaction identity for the second part of the token generated from resource authorization server 104. In step 408, authorization module 118 looks up transaction table 120 using the transaction identity as the index. When local authorization server 106 receives the transaction identity, authorization module 118 uses the transaction identity to look up transaction table 120. If the transaction identity is found in transaction table 120, authorization module 118 finds the second part of the token and the API key identity attributes associated with the transaction identity in transaction table 120.

In step 410, authorization module 118 retrieves client identity attributes through registry server 110 via an IP address of client 102. In an example, authentication module 118 may be in connection to registry server 110 through local authorization server 106 in private network 114. Authentication module 118 may get the client identity attributes though a source IP address of client 102 which may be in the same organization internal network with local authorization server 106 and registry server 110 in private network 114. In one or more embodiments, authorization module 118 may include policy module 122 that may retrieve the client identity attributes pertaining to the request from client 102. The client identity attributes may or may not necessary to be carried in the request from client 102. Policy module 122 may get a source IP address of the connection over which the request of client 102 is made. In some examples, the connection can be a TCP/IP connection. Policy module 122 may use the IP address to query the application runtime instance registry. The query result may contain associated client identity attributes that policy module 122 can use for policy enforcement.

In step 412, authorization module 118 matches a policy using the API key identity attributes and the client identity attributes. In one or more embodiments, policy module 122 generates one or more policies that may authorize client 102 to use API keys. Policies can be added to or deleted from local authorization server 106 by an administrator. In an example, a policy may include a subject section and a target section. The subject section may include a client type attribute along with other client identity attributes pertaining to that type that could be used to identify a client or a set of clients. The target section may include API key identity attributes that could be used to identify an API key or a set of API keys. A client request is determined to match a policy if the client identity attributes of the request match the ones in subject section of the policy and the API key identity attributes of the matched transaction table entry match the ones in the target section of the policy. Policy module 122 may examine all configured policies one by one until a policy is matched. If a policy is matched, the client is authorized to get the token segment. If none of the policies is matched, policy module 122 may reject the client request.

In step 414, authorization module 118 sends the second part of the token to client 102. Authorization module 118 may examine all configured policies one by one until a policy is matched via by policy module 122. If a policy is matched, the client is authorized to get the second part of the token requested. If none of the policies is matched, authorization module 118 may reject the client request via policy module 122.

Figure 5:
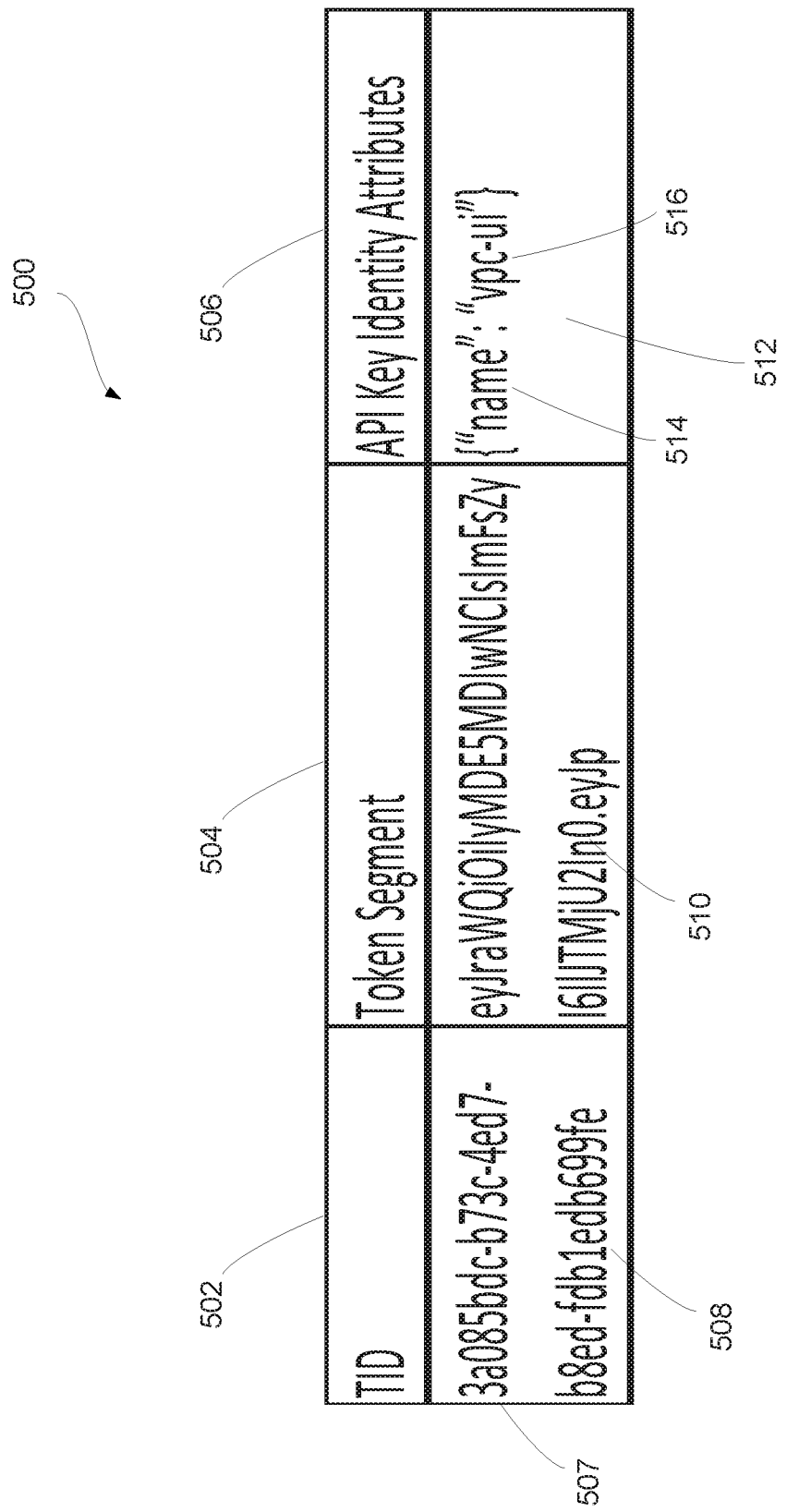
FIG. 5 is an example transaction table of the authorization module included in the local authorization server of FIG. 1, in accordance with an embodiment of the present disclosure.

FIG. 5 is an example transaction table 500 of transaction table 120 in authorization module 118 of local authorization server 106 in accordance with an embodiment of the present disclosure.

In the example of FIG. 5, transaction table 120 includes transaction identity (TID) column 502, token segment column 504, and API key identity attributes column 506. Transaction table 120 may include one or more entries for transactions when resource authorization server 104 generates tokens for client 102 using an API key to request access to a service from service server 112. Each entry of transaction table 120 may include a transaction identity as an index, a token segment, and API key identity attributes associated with the API key that client 102 uses to request access through resource authorization server 104. For each entry 507, the associated TID 508, token segment 510, and API key identity attributes 512 may be under each column respectively. In the depicted example, API key identity attributes 512 include the type of "name" 514 as an identity. The type of "name" 514 has a value of "vpc-ui" 516 as the name to identify the associated API key with TID 508 and token segment 510. Policy module 122 may look up transaction table 120 using TID 508. When TID 508 is found in transaction table 120, local authorization server 106 retrieves token segment 510 and API key identity attributes 512 associated with TID 508 in transaction table 500. When entry 507 is found, policy module 122 may enforce the configured policies to decide whether client 102 is authorized to get token segment 510. Policy module 122 may examine all configured policies one by one until a policy is matched. If a policy is matched, the client is authorized to get token segment 510. If none of the policies is matched, policy module 122 may reject the client request.

FIG. 6 is an example client identity attribute table 600 illustrating a client type, a client type description, and a client identity attribute in accordance with an embodiment of the present disclosure.

In the example of FIG. 6, client identity attribute table 600 includes columns of client type 602, client type description 604, and client identity attribute 606. Client type 602 is a name of a type of client 102. Client type description 604 is a description of the type of client 102. Client identity attribute 606 is an attribute that can identify client 102 or the type of client 102. For example, as illustrated in row 608, "kube-pod" is a type of client 102. A description for this type of client 102 is "This is to select Kubernetes pod(s)". Example attributes to identify this type of client 102 include "name", "label", and "namespace". As illustrated in row 610, "cf-app" is a type of client 102. A description for this type of client 102 is "This is to select Cloud Foundry application(s)". Example attributes to identify this type of client 102 include "name", "org", and "space". Further as illustrated in row 612, "raw" is a type of client 102. A description for this type of client 102 is "This is to use ip-whitelist kind of style to select clients". Example attributes to identify this type of client 102 include "ip_prefix". In an example, client 102 can be an application that is configured with an API key and uses the API key to exchange for an access token to access a service. In another example, client 102 can be an application runtime instance that possess one or more unique internet protocol address(es) across private network 114. The runtime instance could be a physical server, a virtual server, an application instance, a docker container instance or a pod. Client type 602 may indicate the runtime instance type and correspond client identity attribute 606 to be used for matching a client request with a policy. Client identity attribute 606 is one that can be used to identify a client or a set of clients. Each type of clients may use different sets of client identity attributes. For example: a cloud foundry client may use an organization name, a space name, and an application name as an identity attribute to identify the cloud foundry client. A Kubernetes pod may use a name space, a pod name, and a pod label as an identity attribute to identify the Kubernetes pod.

FIG. 7 is an example policy table 700 illustrating policies in accordance with an embodiment of the present disclosure.

In one or more embodiments, policy module 122 is configured to generate policies that may authorize client 102 to use an API key. A policy can be added to or deleted from local authorization server 106 by an administrator. In an example, a policy may include a subject section and a target section. The subject section may include a client type attribute along with other client identity attributes pertaining to that type that could be used to identify a client or a set of clients. The target section may include an API key identity attribute that could be used to identify an API key or a set of API keys.

In the example of FIG. 7, column policy example 702 lists example policies 704A-C. Column description 703 lists description for each example policy 704A-C. Each example policy 704A-C includes subject section 705A-C and target section 706A-C respectively. Subject section 705A-C may include a client type attribute along with other client identity attributes pertaining to that type that could be used to identify a client or a set of clients. Target section 706A-C may include an API key identity attribute that could be used to identify an API key or a set of API keys. For example, example policy 704A includes subject section 705A and target section 706A. Subject section 705A indicates the client "type" is "kube-pod" and the client identity attribute is the "label" with "app=foo-ui-fronted". Target section 706A indicates the "name" of the API key is "foo-ui-s3-apikey". Example policy 704A means, as illustrated in column description 703, to authorize all the Kubernetes pods whose name contains "foo-ui-" prefix to use an API key that has the name "foo-ui-s3-apikey". In another example policy 704B, example policy 704B includes subject section 705B and target section 706B. Subject section 705B indicates the client "type" is "cf-app" and the client identity attribute are "org" with vpc@xyz.com and "space" with "prod". Target section 706B indicates the "name" of the API key is "foo-ui-s3-apikey". Example policy 704B means, as illustrated in column description 703, to authorize all cloud foundry applications in "prod" space, foo@xyz.com organization to use the API key that has the name "foo-ui-s3-apikey". In another example policy 704C, example policy 704C includes subject section 705C and target section 706C. Subject section 705C indicates the client "type" is "raw" and the client identity attribute is "ip-prefix". Target section 706C indicates the "name" of the API key is "foo-ui-s3-apikey". Example policy 704C means, as illustrated in column description 703, to authorize client 102 in subnet 192.168.1.0/24 to use the API key that has the name "foo-ui-s3-apikey".

Figure 8:
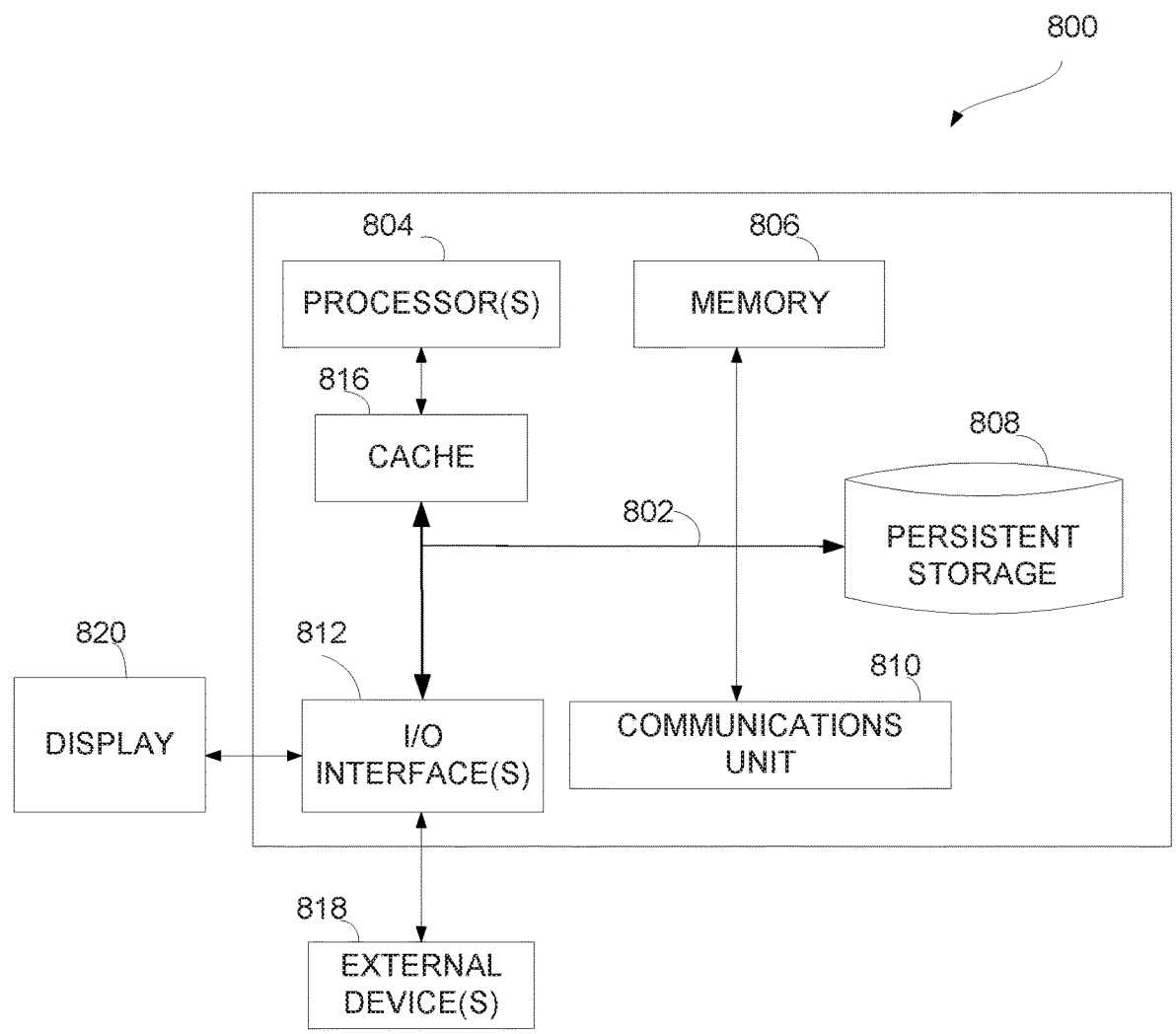
FIG. 8 is a block diagram of components of each of the client, the resource authorization server, the local authorization server, the registry server, and the service server of FIG. 1, in accordance with an embodiment of the present disclosure.

FIG. 8 depicts a block diagram 800 of components of each of client 102, resource authorization server 104, local authorization server 106, registry server 110, and service server 112 in accordance with an illustrative embodiment of the present disclosure. It should be appreciated that FIG. 8 provides only an illustration of one implementation and does not imply any limitations with regard to the environments in which different embodiments may be implemented. Many modifications to the depicted environment may be made.

Client 102, resource authorization server 104, local authorization server 106, registry server 110, and service server 112 each may include communications fabric 802, which provides communications between cache 816, memory 806, persistent storage 808, communications unit 810, and input/ output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

API key module 116 and authentication module 118 may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. API key module 116 and authentication module 118 may be downloaded to persistent storage 808 through communications unit 810.

I/O interface(s) 812 allows for input and output of data with other devices that may be connected to client 102, resource authorization server 104, local authorization server 106, registry server 110, and or service server 112. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., API key module 116 and authentication module 118 can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
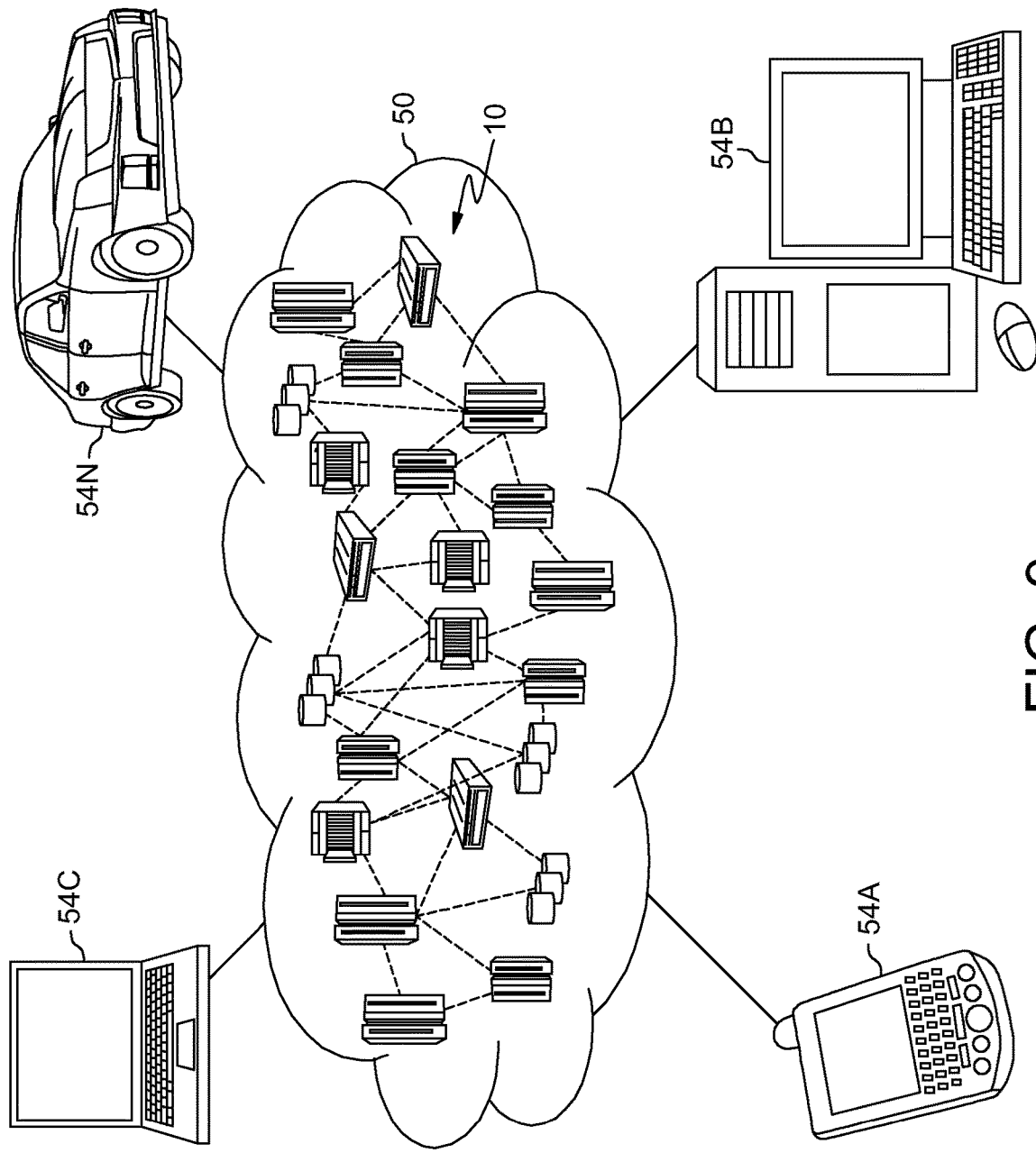
FIG. 9 depicts an embodiment of a cloud computing environment in accordance with the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
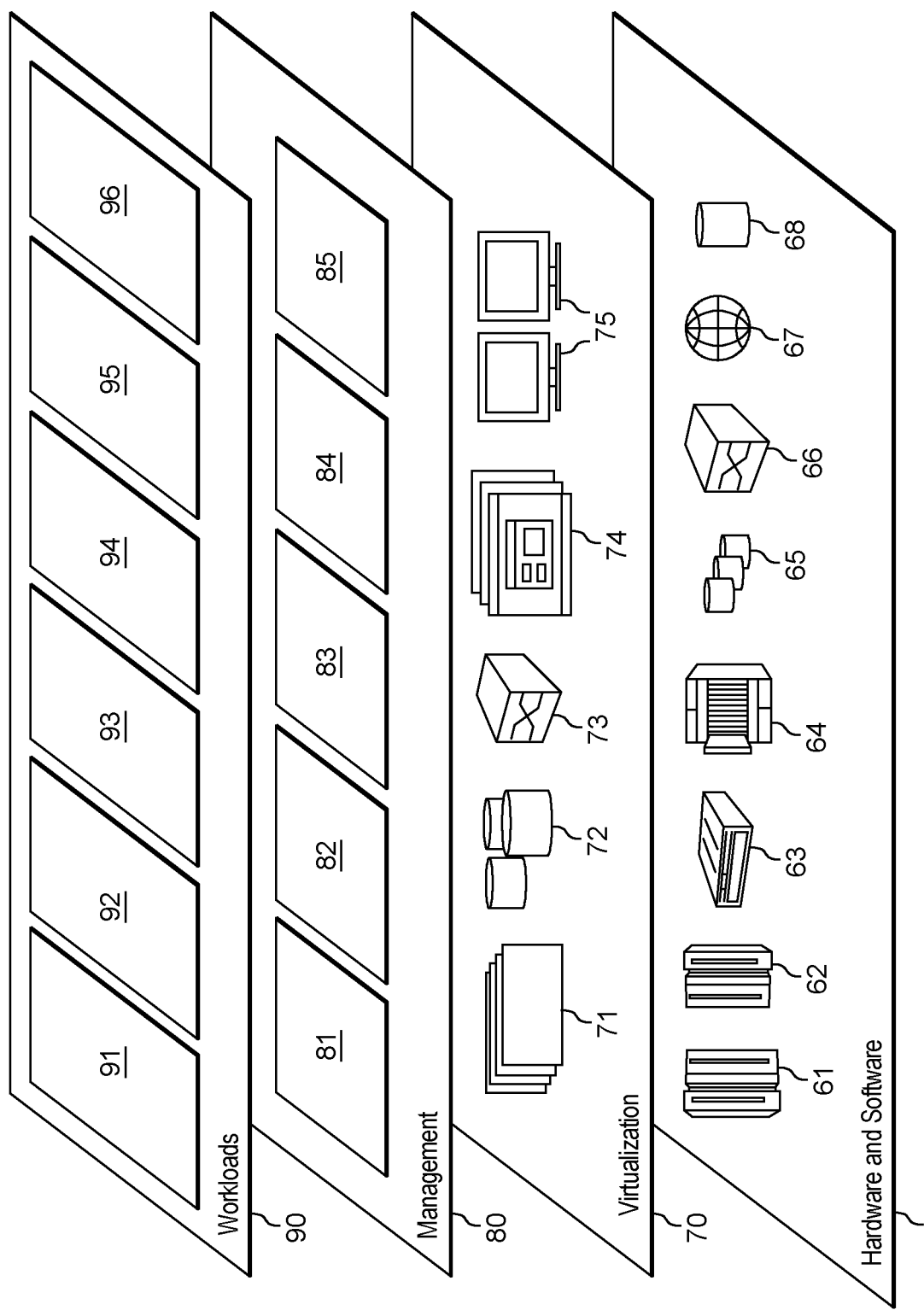
FIG. 10 depicts an embodiment of abstraction model layers of a cloud computing environment, in accordance with the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, API key module 116, and or authentication module 118 as described above with respect to API key access authorization environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
receiving, by one or more processors, a transaction identity, a second part of a token, and an API key identity attribute from a first server, the transaction identity being generated in the first server associated with generating the token including a first part and the second part;
receiving, by one or more processors, a request from a client with the transaction identity for the second part of the token;
looking up, by one or more processors, a transaction table via the transaction identity as an index, the transaction identity being associated with the second part of the token and the API key identity attribute;

retrieving, by one or more processors, a client identity attribute through a second server via an IP address of the client, the second server registering the client;

matching, by one or more processors, a policy via the API key identity attribute and the client identity attribute, wherein the policy includes a subject section and a target section, the subject section including a client type attribute associated with the client identity attribute, the target section including the API key identity attribute that identifies an API key, wherein matching the policy includes matching the client identity attribute in the subject section of the policy and matching the API key identity attribute of a transaction table entry in the target section of the policy; and sending, by one or more processors, the second part of the token to the client.

2. The computer-implemented method of claim 1, wherein the first server receives an access request from the client with an API key, wherein the first server validates the API key, and wherein the first server sends the transaction identity and the first part of the token to the client.

3. The computer-implemented method of claim 1, wherein the client is an application that requests an access to a service from a third server via an API key being generated in the first server.

4. The computer-implemented method of claim 1, wherein the policy includes a whitelist ruleset and a blacklist ruleset.

5. The computer-implemented method of claim 1, wherein the client uses the first and second parts of the token to access the service in a third server.

6. A computer program product comprising:
one or more computer readable storage media, and program instructions collectively stored on the one or more computer readable storage media, the program instructions comprising:
program instructions to receive a transaction identity, a second part of a token, and an API key identity attribute from a first server, the transaction identity being generated in the first server associated with generating the token including a first part and the second part;
program instructions to receive a request from a client with the transaction identity for the second part of the token;
program instructions to look up a transaction table via the transaction identity as an index, the transaction identity being associated with the second part of the token and the API key identity attribute;
program instructions to retrieve a client identity attribute through a second server via an IP address of the client, the second server registering the client;
program instructions to match a policy via the API key identity attribute and the client identity attribute, wherein the policy includes a subject section and a target section, the subject section including a client type attribute associated with the client identity attribute, the target section including the API key identity attribute that identifies an API key, wherein program instructions to match the policy include program instructions to match the client identity attribute in the subject section of the policy and to match the API key identity attribute of a transaction table entry in the target section of the policy; and
program instructions to send the second part of the token to the client.

7. The computer program product of claim 6, wherein the first server receives an access request from the client with an API key, wherein the first server validates the API key, and wherein the first server sends the transaction identity and the first part of the token to the client.

8. The computer program product of claim 6, wherein the client is an application that requests an access to a service from a third server via an API key being generated in the first server.

9. The computer program product of claim 6, wherein the policy includes a whitelist ruleset and a blacklist ruleset.

10. The computer program product of claim 6, wherein the client uses the first and second parts of the token to access the service in a third server.

11. A computer system comprising:
one or more computer processors, one or more computer readable storage media, and program instructions stored on the one or more computer readable storage media for execution by at least one of the one or more computer processors, the program instructions comprising:
program instructions to receive a transaction identity, a second part of a token, and an API key identity attribute from a first server, the transaction identity being generated in the first server associated with generating the token including a first part and the second part;
program instructions to receive a request from a client with the transaction identity for the second part of the token;
program instructions to look up a transaction table via the transaction identity as an index, the transaction identity being associated with the second part of the token and the API key identity attribute;
program instructions to retrieve a client identity attribute through a second server via an IP address of the client, the second server registering the client;
program instructions to match a policy via the API key identity attribute and the client identity attribute, wherein the policy includes a subject section and a target section, the subject section including a client type attribute associated with the client identity attribute, the target section including the API key identity attribute that identifies an API key, wherein program instructions to match the policy include program instructions to match the client identity attribute in the subject section of the policy and to match the API key identity attribute of a transaction table entry in the target section of the policy; and
program instructions to send the second part of the token to the client.

12. The computer system of claim 11, wherein the first server receives an access request from the client with an API key, wherein the first server validates the API key, and wherein the first server sends the transaction identity and the first part of the token to the client.

13. The computer system of claim 11, wherein the client is an application that requests an access to a service from a third server via an API key being generated in the first server.

14. The computer system of claim 11, wherein the policy includes a whitelist ruleset and a blacklist ruleset.

\* \* \* \* \*